July 1, 1930. W. F. HENDRY 1,769,025
MANUFACTURE OF LUMINESCENT TUBES
Filed Sept. 13, 1927
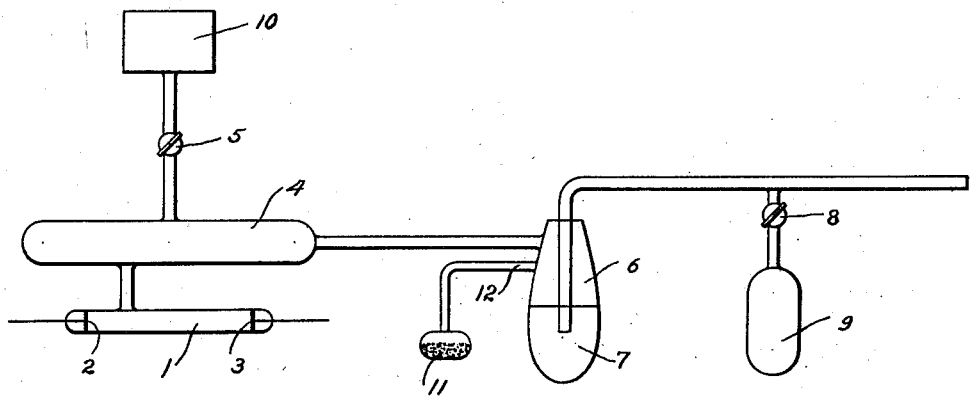
INVENTOR
William F. Hendry
BY
ATTORNEY Patented July 1, 1930

1,769,025

UNITED STATES PATENT OFFICE

WILLIAM F. HENDRY, OF OSSINING, NEW YORK, ASSIGNOR TO MANHATTAN ELECTRICAL SUPPLY COMPANY, INC., OF NEW YORK, N. Y., A CORPORATION OF MASSACHUSETTS

MANUFACTURE OF LUMINESCENT TUBES

Application filed September 13, 1927. Serial No. 219,323.

This invention relates to the manufacture of gaseous discharge tubes employing a filling of a rare gas, and in particular it relates to methods and means for conditioning and purifying the gas to be used as a filling.

As is well known, in the manufacture of luminescent tubes of this character, particularly those tubes which utilize the luminescent properties of a rare gas such as neon under the influence of an electrical discharge, it is imperative that the gas content of the tube be free from impurities which have been found to reduce the luminous efficiency and which curtail the life of the tube. Heretofore various methods have been proposed for purifying or cleaning the gas to be used as the source of light. For example, according to one known method, the gas to be purified is brought into contact with an impurity absorbing material such as a heated alkaline earth metal. Another method utilizes an electrical discharge through the impure gas in the presence of an agent which combines chemically with the impurities. That is, according to the methods of the prior art where absorption is relied upon alone for the removing of the impurities, the absorbing material has generally been in the form of a solid over which the impure gas is caused to pass. It will be readily appreciated that according to these methods a considerable length of time is required before the entire body of gas is purified, in view of the difficulty of rapidly bringing the gas into intimate contact with the absorbing material. To reduce this time of absorption it has been proposed to heat the absorbent material in one case, and in another to provide a mechanical diffusion of the gas over the material. These latter solutions, however, require the employment of relatively complex apparatus.

Accordingly, it is an object of the present invention to provide a method of manufacturing a luminescent tube wherein the gas content is purified without the necessity of employing an electrical discharge and without the necessity of heating the absorbent material during the purifying operation. In accordance with this object, the time required for purifying is materially reduced and does not necessitate the use of expensive and relatively complex heating or discharge producing apparatus.

A feature of the invention relates to an alloy of sodium and potassium to be used in the manufacture of luminescent tubes for directly separating a desired gas from a mixture of gases.

A further feature of the invention resides in the method of filling a luminescent tube with an inert gas and continuously and rapidly purifying the said gas during the filling operation.

According to the method of the present invention, the filling, which is preferably of neon or similar gas, prior to its entry into the tube is passed or "bubbled" through a liquid alloy which removes undesirable impurities and allows substantially pure neon alone to enter the tube. It has been found that a suitable material for thus removing the impurities consists of an alloy of sodium and potassium in appropriate proportions to form a liquid at ordinary temperatures. When a quantity of impure neon is passed through an alloy of this character substantially pure neon is produced.

An example of apparatus to which the invention may be advantageously applied is shown in the accompanying drawing, the single figure of which is intended to be schematic.

The drawing illustrates a glass tube 1, which is sealed to a header or manifold 4. The tube 1 may have any desired shape and is provided with suitable electrodes 2 and 3 for conducting the discharge through the tube when it is used for illuminating or other purposes. The manifold is connected through any suitable system of valves represented schematically by valve 5 with the vacuum pump 10. This latter pump may be of any suitable type such as a molecular pump by means of which the tube 1 may be completely evacuated of air. The manifold 4 shown is also connected to the trap 6 which contains a quantity of a liquid alloy of sodium and potassium represented by the numeral 7. As is well known, an alloy of this character within very wide ranges of proportions of sodium and potassium assumes the form of a liquid at ordinary temperatures. The trap 6 is in turn connected through suitable valves 8 to a gas container 9 which, if desired, may be connected to a force pump. Suitable pressure measuring means may be connected betwen the gas container 9 and the manifold 4 for determining the pressure of the gas admitted to the tube 1.

One preferred method for preparing the sodium-potassium liquid alloy 7 is as follows. The sodium and potassium in the form of sticks are cut into small pieces in a shallow dish partially filled with oil. The cut-up material is then put as rapidly as possible into a small flask 11 of pyrex or similar glass which is substantially unaffected by pure potassium. Flask 11 is immediately fused on to the extension 12 which leads to the trap 6. Heat is next applied to the flask 11 whereupon the sodium and potassium are simultaneously distilled over into the trap where they condense to form the desired alloy preferably of 70% sodium and 30% potassium. As soon as a sufficient quantity of the alloy has thus been prepared the flask 11 is sealed off from the trap.

With tube 1 properly sealed to the header 4 and the gas container 9 properly connected, the valve 8 is closed, the valve 5 opened and the pump 6 is started in operation. When the air has thus been completely exhausted from the tube the valve 5 may be closed and if desired the tube may be heated to any desired temperature or subjected to an electrical discharge to further remove any desirable gases which may be occluded in the walls of the tube or in the electrode materials. When the tube has been completely exhausted the valve 5 is closed and valve 8 is opened, and the neon or other gas is permitted to pass from the container 9 into the manifold 4 after passing through the liquid alloy 7 which during the passage of the gas removes substantially all the undesirable impurities and allows pure neon to enter the tube 1. When the desired pressure of gas in tube 1 has been reached valve 8 is closed and the tube is sealed off from the header 4.

While in the foregoing a particular proportion of sodium and potassium (70% sodium, 30% potassium) is described, it will be apparent that any desired proportions may be employed as long as the proportions are sufficient to produce a liquid alloy. In practice an alloy containing as high as 50% sodium and 50% potassium has been found to give satisfactory results. Inasmuch, however, as potassium has a destructive effect on ordinary glass it is preferable to keep the percentage of potassium as low as possible.

From the foregoing description it will be seen that the process of filling the tubes and the purification of the gas content is accomplished in a continuous and single operation and does not require any complicated heating or electrical apparatus for producing discharge.

Furthermore, the term "pure neon" as employed in the foregoing description is understood to mean neon of such purity, to provide sufficient conductivity and brilliancy when an electrical discharge is passed therethrough to render it practicable in commercial devices.

What I claim is:

1. In the manufacture of luminescent tubes, the process of purifying commercial neon which comprises bubbling said neon through an alloy of sodium and potassium liquid at room temperature prior to its entry into the tube.

2. The process of purifying an inert gas which comprises bubbling the gas through an alloy of alkali metals liquid at room temperature.

3. The process of purifying an inert gas which comprises causing said gas intimately to contact with an alloy of alkali metals liquid at room temperature.

In testimony whereof, I have signed my name to this specification this 8th day of September, 1927.

WILLIAM F. HENDRY.